United States Patent [19]
Cohen et al.

[11] 3,752,172
[45] Aug. 14, 1973

[54] JET PENETRATION CONTROL

[75] Inventors: Leonard S. Cohen, West Hartford; Lawrence J. Coulter, Manchester, both of Conn.

[73] Assignee: United Aircraft Corporation, East Hartford, Conn.

[22] Filed: June 14, 1971

[21] Appl. No.: 152,923

[52] U.S. Cl.................. 137/12, 137/805, 137/829
[51] Int. Cl............................ F15c 1/08, F15c 3/00
[58] Field of Search.................... 137/81.5, 12, 805, 137/825, 829

[56] References Cited
UNITED STATES PATENTS

| | | | |
|---|---|---|---|
| 3,212,515 | 10/1965 | Zisfein et al. | 137/81.5 |
| 3,182,674 | 5/1965 | Horton | 137/81.5 |
| 3,396,738 | 8/1968 | Heskestad | 137/81.5 X |
| 3,398,758 | 8/1968 | Unfried | 137/81.5 |
| 3,405,725 | 10/1968 | Fox | 137/81.5 |
| 3,413,994 | 12/1968 | Sowers | 137/81.5 |
| 3,425,433 | 2/1969 | Moore | 137/81.5 |
| 3,640,256 | 2/1972 | Mangion | 137/81.5 X |
| 3,624,751 | 11/1971 | Dettling | 137/81.5 |

*Primary Examiner*—Samuel Scott
*Attorney*—Donald F. Bradley

[57] ABSTRACT

The penetration of a sonic or supersonic gaseous jet injected through a bounding wall into a sonic or supersonic cross flow is controlled by modification of the approach flow boundary layer. Penetration is increased when the separation pressure is reduced by disturbing the approach flow boundary layer. Both transpiration of small amounts of gas into the boundary layer, and positioning a trip or blockage element upstream of the injection station, will produce increased penetration.

15 Claims, 5 Drawing Figures

JET PENETRATION CONTROL

BACKGROUND OF THE INVENTION

1. Field of the Invention

This invention relates to a method and apparatus for controlling the penetration of a sonic or supersonic gaseous jet injected through a wall into a sonic or supersonic cross flow stream, and specifically to increasing the penetration by promoting separation of the approach flow boundary layer of the cross flow stream. Increasing the penetration will enhance the mixing of the injected gas into the cross flow stream.

2. Description of the Prior Art

Gaseous jets are commonly injected through slots or holes in a boundary wall into a sonic or supersonic cross flow stream for various purposes such as to fuel a vehicle, to provide thrust vector control in rocket nozzles, to trip the boundary layer in a hypersonic wind tunnel, or to activate a thermal laser.

In these applications as well as others, it is desirable to vary the extent to which the jets penetrate the cross flow stream as conditions change.

Heretofore control of jet penetration for a given set of approach flow conditions has been effected through the variation of injector hole diameter and angle of injection, and/or injectant total pressure. However, variable geometry methods of control are often inconvenient, expensive and undesirably complex. Use of injectant flow (total pressure) variations for control is likewise limited due to restrictions in many applications imposed on the local injectant to free-stream mass ratio, e.g., fuel-to-air ratio, and the available delivery pressure.

The present invention provides a method and apparatus for controlling jet penetration in a simple manner and over a wider range than is available by conventional means. This control is independent of both injector geometry and injectant properties.

SUMMARY OF THE INVENTION

In accordance with the present invention, modification of the approach flow boundary layer of the cross flow stream will provide desirable control of the gas jet penetration, and ultimately the mixing of the streams. Any condition which promotes separation in the approach boundary layer, such as blowing, adverse pressure gradient, or movement of the wall in a direction counter to the cross flow, will cause an increase in penetration. Conversely, a favorable pressure gradient, suction, roughness, or movement of the wall in the direction of flow, will reduce the penetration of wall injected jets.

In a specific embodiment of the present invention, transpiration of small amounts of gas into the cross flow boundary layer will result in increased penetration.

In another embodiment of the present invention, increased penetration is produced by a trip or blockage element placed upstream of the injection station.

The present invention is more fully described with reference to the following specification and the drawings.

FIG. shows a curve in which is plotted the penetration of the gas into the supersonic stream for varying amounts of mass addition.

Figure 1:
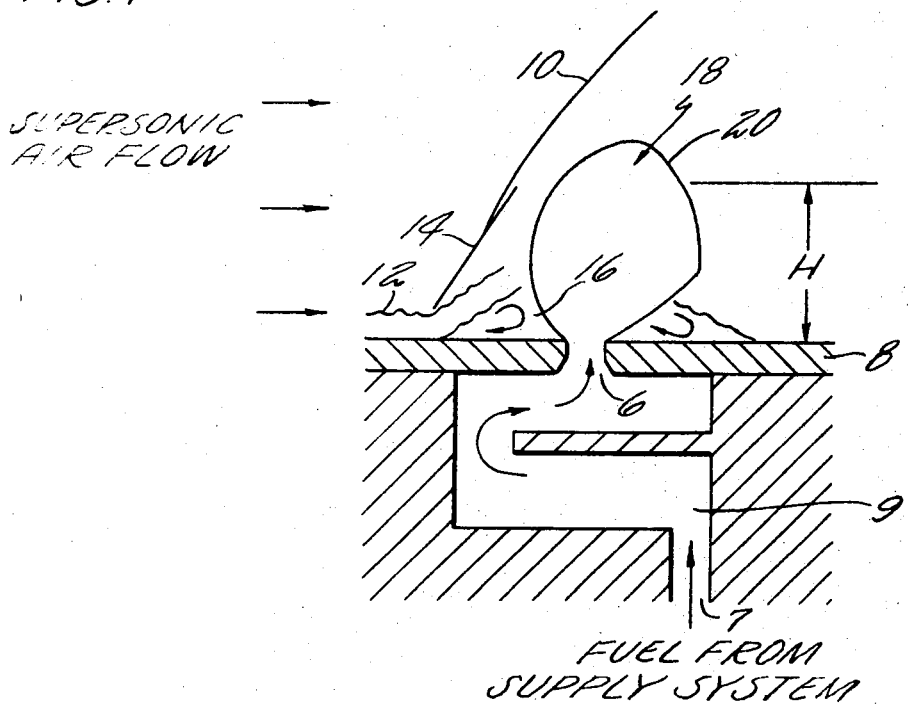
FIG. 1 shows schematically the flow pattern resulting from introduction of a gas into a supersonic mainstream.
Figure 4:
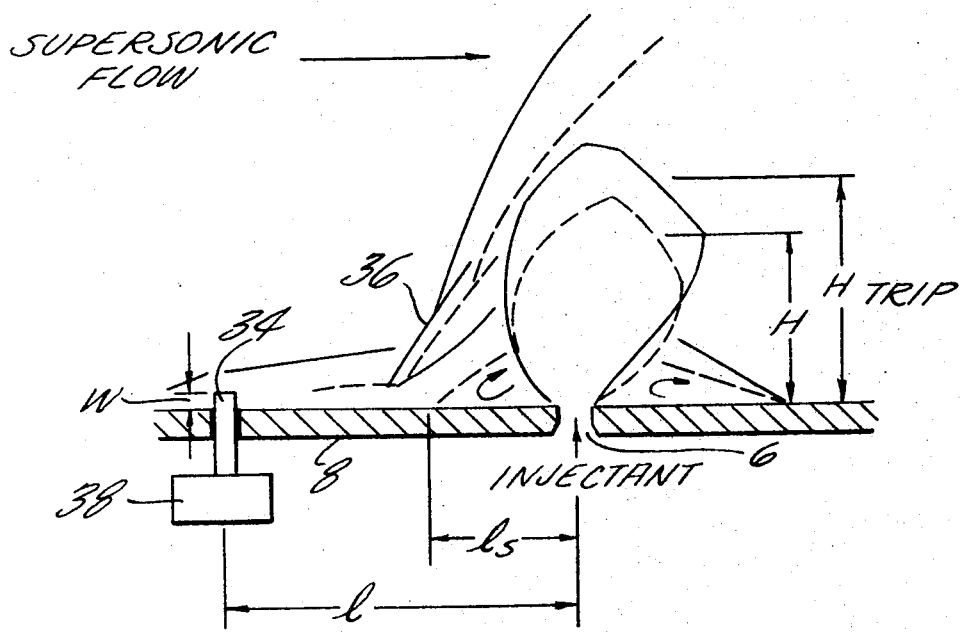

FIG. 4 shows schematically a trip positioned upstream of the gas injection station of FIG. 1 to disturb the boundary layer.

Figure 5:
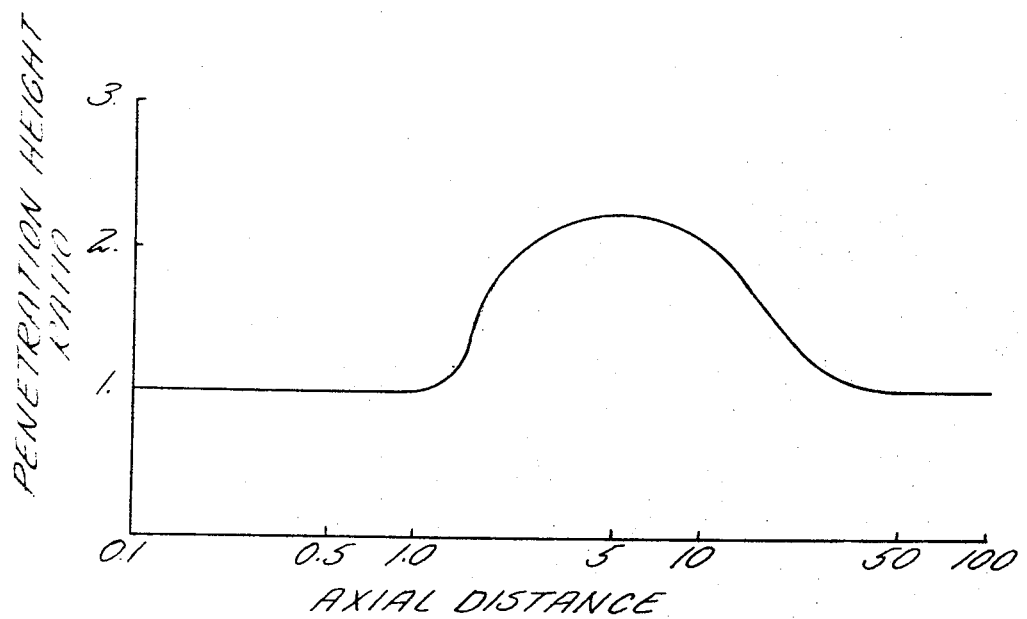

FIG. 5 shows a curve illustrating the penetration variation achieved with the apparatus of FIG. 4.

DESCRIPTION OF THE PREFERRED EMBODIMENT

In FIG. 1 there is shown the observed flow pattern which results when a gas is injected into a supersonic stream through a circular port flush mounted in a bounding wall. The injection may occur for example when fuel is injected into the combustor of a supersonic combustion ramjet. Fuel is fed from a fuel supply (not shown) through passage 7 into chamber 9, and injected into the supersonic stream through port 6 in bounding wall 8. The bow shock 10 associated with the obstruction of the mainstream airflow caused by the injection separates the wall boundary layer 12 from the wall 8. The oblique shock 14 off the separated region 16 of the flow merges into the stronger bow shock 10. The underexpanded fuel jet 18 expands into the lower surrounding pressure and displays a Mach disc 20 which is typically associated with jets expanding into a quiescent medium. As shown in FIG. 1, the jet is turned as a result of its interaction with the supersonic airstream so that the Mach disc is inclined to the horizontal.

The penetration of the jet into the supersonic airflow reflecting the extent of its entry into the airflow may be selected as the distance from the wall to the center of the Mach disc, shown in FIG. 1 as the distance H. For a more complete discussion of the above analysis, reference may be had to the article "Penetration of Gaseous Jets Injected into a Supersonic Stream," J. A. Schetz and F. S. Billing, J. Spacecraft, Vol. 3, No. 11, Nov. 1966.

In the various applications involving jet interaction, it is desirable to vary the extent to which the jet penetrates the cross flow stream as conditions change. For example in a supersonic combustion ramjet, in portions of the flight envelope where combustion is mixing limited, i.e, at high combustor entrance temperatures, it is essential that fuel penetration be maximized for all combinations of air and fuel conditions at a given injector geometry.

It has been determined in an analysis correlating fuel penetration data that penetration depends on the diameter D of the exit port 6, the injectant (fuel) total pressure $P_{T_j}$, and the effective back pressure $P_{eb}$ taken equal to 80 percent of the static pressure behind a normal shock in the airstream. The effective back pressure can also be thought of as a separation pressure, however, so that any change or procedure which influences the boundary layer separation process would also lead to a change in $P_{eb}$. The complete expression is $$H = 0.6455D \ (P_{T_j}/P_{eb})\ 0.5$$

where $H$ is the distance from the bounding wall to the center of the Mach disc as shown in FIG. 1. A more complete description of the analysis may be had be reference to Hydrocarbon-Fueled Scramjet, Vol. VII, Fuel Distribution Study, L. S. Cohen, L. J. Coulter and L. Chiappetta, AFAPL-TR-68-146, April 1970.

Figure 2:
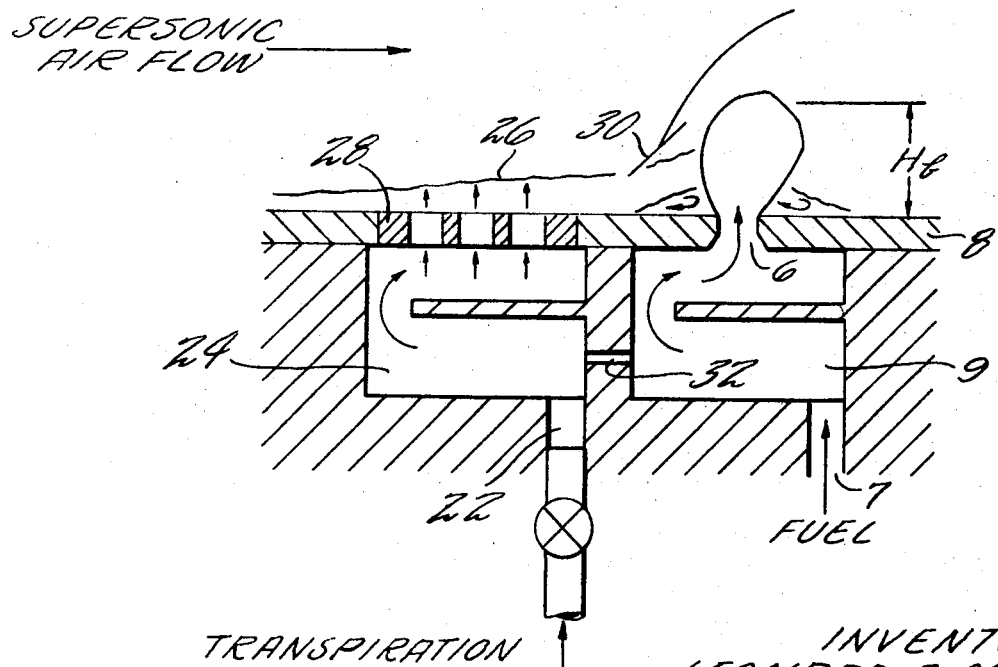
FIG. 2 shows schematically the use of upstream mass addition to disturb the approach flow boundary layer of the supersonic stream of FIG. 1.

As shown in FIG. 2, upstream mass addition may be used to reduce the separation pressure by disturbing the approach flow boundary layer. This will increase the penetration of the gas into the supersonic flow stream. Referring to FIG. 2, gaseous material is supplied from a source (not shown) through a passage 22 into plenum chamber 24 for injection into the approach boundary layer 26 through a plate 28 containing several large holes to minimize the blowing pressure drop. This mass addition thickens and generally disturbs the boundary layer with the result that the boundary layer is easier to separate from the bounding wall. In this case the separation shock 30 is weaker than that shown in FIG. 1, and thus the separation pressure is lower. An augmented jet penetration $H_b > H$ results.

Figure 3:
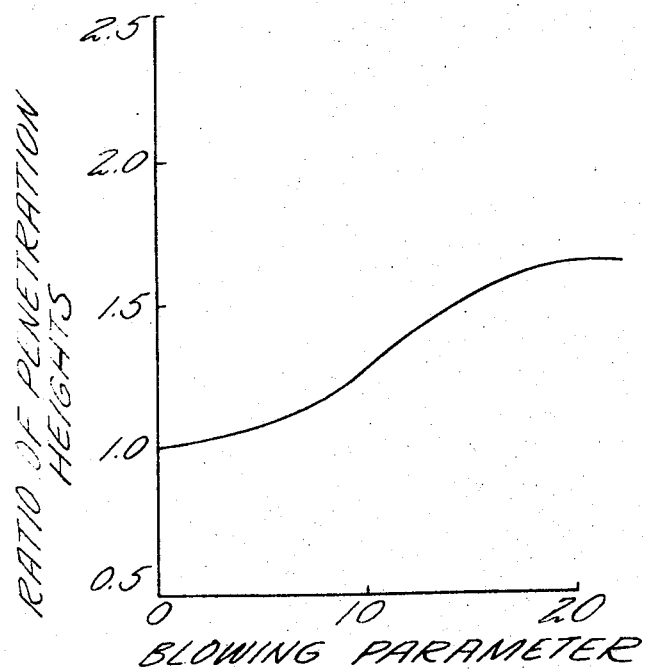

FIG. 3 shows experimental results for tests conducted on the apparatus of FIG. 2. Argon was injected at Mach 1 into a Mach 3 airstream. The results shown in FIG. 3 indicate that $H_b$, the penetration with upstream mass addition (blowing) is significantly larger than that without blowing $$\rho_b V_b / [\rho_{oo} V_{oo} (C_{fo}/2)]$$

in which $\rho_b V_b$ is the transpiration material mass flux, $\rho_{oo} V_{oo}$ is the free stream mass flux, and $C_{fo}$ is the local skin friction coefficient without blowing. The effect of the material addition on the free stream was minimal for all values of the blowing parameter tested. The results of FIG. 3 are independent of the properties of the transpired gas.

Thus, introducing a very small amount of mass into the approach flow boundary layer will result in a substantial increase in jet penetration. A blowing parameter of 20 in FIG. 3 corresponds to a blowing to free stream weight flow ratio of 0.0026 or a blowing to injectant weight ratio of 0.05. There are no important total pressure losses associated with the disclosed approach.

Since any desired fluid may be used to produce the enhanced penetration, the injected fluid such as fuel could be bled from the downstream plenum 9 in FIG. 2 via bleed holes 32 to feed the upstream plenum 24. In this approach no additional plumbing is required and no additional transpiration fluid need be supplied. In a ramjet, this method could be used as a control for jet penetration in order to control, in turn, heat release versus combustor axial location.

Another method and apparatus for reducing the separation pressure is shown in FIG. 4. A trip (blockage element) 34 is placed upstream of the injection port 6 and constitutes the disturbance producing element. The trip 34 may be any solid element for disturbing the cross flow such as a wire, rod, etc.

As shown in FIG. 4, a trip of height W is placed at a distance $l$ from the injection port 6. The boundary layer of the cross flow stream is disturbed and thus more easily separated from the boundary wall. The separation shock 36 is weaker than without the trip, nd thus the separation pressure is lower. An augmented jet penetration $H_{TRIP} > H$ results. FIG. 4 shows the jet penetration both without the trip (dotted lines) and with the trip present.

Variations in the height of the trip, and the extent of the penetration, may be effected by activating a suitable mechanical, hydraulic, electrical or other type mechanism 38.

In tests on the apparatus of FIG. 4, wires with diameters of 0.0125 cm to 0.25 cm were employed as trips. The supersonic cross flow was fixed at Mach 3. The results of the test are shown in FIG. 5 in which the penetration height ratio $H_{TRIP}/H$ is plotted with respect to the axial distance $(l - l_s)/W$ where $l_s$ is the length of the separation region on the upstream side of the jet when no trip is present, and W is the trip wire height. FIG. 5 shows that $H_{TRIP}$, the penetration with the wire present, may be as much as 2.0 H depending on the dimensionless axial distance parameter $(l - l_s)/W$.

The portion of the data for $(l - l_s)/W \geq 5$ was obtained with small wires which were located relatively far from the injection port 6. Total pressure losses associated with the trips for this data are minimal, and no interactions have been observed between trip and injectant separation regions. The penetration behavior observed for $(l - l_s)/W < 5$ was obtained for larger wires placed close to the injection port where strong interactions between trip and injectant separation regions and separation shocks occurred. For most applications it is considered that trip heights should be based on the $(l = l_s)W \geq 5$ data.

Thus, the present invention can be used to produce substantial variations in jet penetration by transpiration of a small amount of a fluid into the approach flow boundary layer, or by introducing a small trip barrier into the approach flow boundary layer.

While the present invention has been disclosed in terms of its preferred embodiments, it will be apparent to those skilled in the art that changes may be made in the construction and arrangement of the apparatus or the details of the method without departing from the scope of the invention as hereinafter claimed.

We claim:

1. Apparatus for increasing the penetration of a fluid jet into a cross flow stream comprising
   a bounding wall having a cross flow stream of supersonic velocity on one side thereof,
   at least one port in said bounding wall through which a fluid jet of at least sonic velocity is injected into said cross flow stream,
   and means for promoting separation of the boundary layer of said cross flow stream from said bounding wall at a predetermined distance upstream from said port.

2. Apparatus for increasing the penetration of of fluid jet into a cross flow stream comprising
   a bounding wall having a cross flow stream of supersonic velocity on one side thereof,
   flow varying means for promoting separation of the boundary layer of said cross flow stream from said bounding wall,
   and means for injecting a fluid jet of at least sonic velocity into said stream through a port in said bounding wall downstream from said flow varying means to thereby increase the mixing of said fluid jet with said stream.

3. A method for controlling the penetration of a fluid jet into a supersonic cross flow stream comprising the steps of
   disturbing the boundary layer flow of the supersonic stream to vary the separation pressure thereof, and injecting the fluid jet into the disturbed stream through a port in a bounding wall to promote mixing of said fluid jet with said stream.

4. A method as in claim 3 in which the step of disturbing the boundary layer flow includes providing mass addition to the stream at the boundary layer of the stream upstream from the fluid jet injection port.

5. A method as in claim 3 in which the step of disturbing the boundary layer flow includes positioning a trip along the bounding wall upstream from the fluid jet injection port.

6. A method as in claim 3 in which the step of disturbing the boundary layer flow includes transpiring a fluid through the bounding wall into the boundary layer of the stream upstream from the fluid jet injection port.

7. A method as in claim 6 in which the transpired fluid is the same as the fluid injected through the port in the bounding wall.

8. Apparatus for controlling the penetration of a fluid jet into a cross flow stream comprising
a bounding wall having a stream of supersonic velocity on one side thereof,
means for disturbing the boundary layer flow of said stream along said bounding boundary to vary the separation pressure thereof, providing
and means for injecting a fluid jet into said disturbed stream through a port in said bounding wall to promote mixing of said fluid jet with said stream.

9. Apparatus as in claim 8 in which said means for disturbing the boundary layer flow of said stream along said bounding wall comprises means for providing mass addition of a second fluid to said stream.

10. Apparatus as in claim 9 in which said means for providing mass addition of a fluid includes means for transpiring said second fluid through said bounding wall.

11. Apparatus as in claim 9 in which said second fluid is identical with the fluid of said fluid jet.

12. Apparatus as in claim 8 in which said means for disturbing the boundary layer flow of said stream along said bounding wall comprises a trip positioned along said bounding wall in the path of said stream upstream from the fluid jet injection port.

13. A method for increasing the penetration of a fluid jet into a supersonic cross flow stream comprising the steps of
reducing the separation pressure at the boundary layer of said cross flow stream,
and injecting the fluid jet into the reduced separation pressure region of the stream through a port in a bounding wall.

14. A method as in claim 13 in which the step of reducing the separation pressure includes the step of injecting a small amount of mass through the bounding wall into the boundary flow layer upstream from the fluid jet injection port.

15. A method as in claim 13 in which the step of reducing the separation pressure includes the step of positioning a blockage element along the bounding wall in the path of the stream upstream from the fluid jet injection port.

* * * * *

PO-1050
(5/69)

UNITED STATES PATENT OFFICE
CERTIFICATE OF CORRECTION

Patent No. 3,752,172        Dated August 14, 1973

Inventor(s) Leonard S. Cohen and Lawrence J. Coulter

It is certified that error appears in the above-identified patent and that said Letters Patent are hereby corrected as shown below:

Claim 8, column 5, line 24, "boundary" should be --wall--.

Claim 8, column 5, line 25, "providing" should be cancelled.

Signed and sealed this 20th day of November 1973.

(SEAL)
Attest:

EDWARD M. FLETCHER, JR.
Attesting Officer

RENE D. TEGTMEYER
Acting Commissioner of Patents